United States Patent Office 3,167,601
Patented Jan. 26, 1965

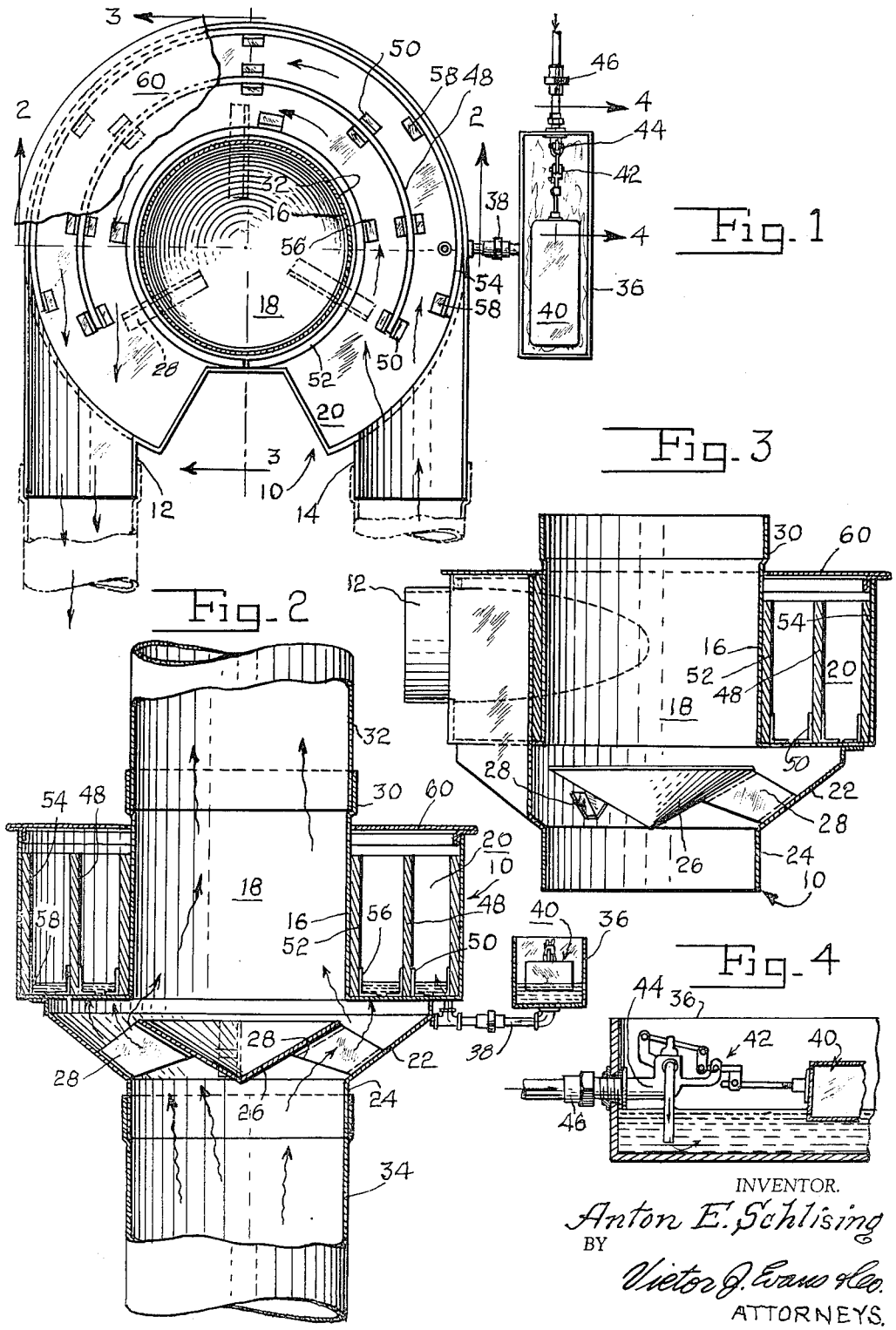

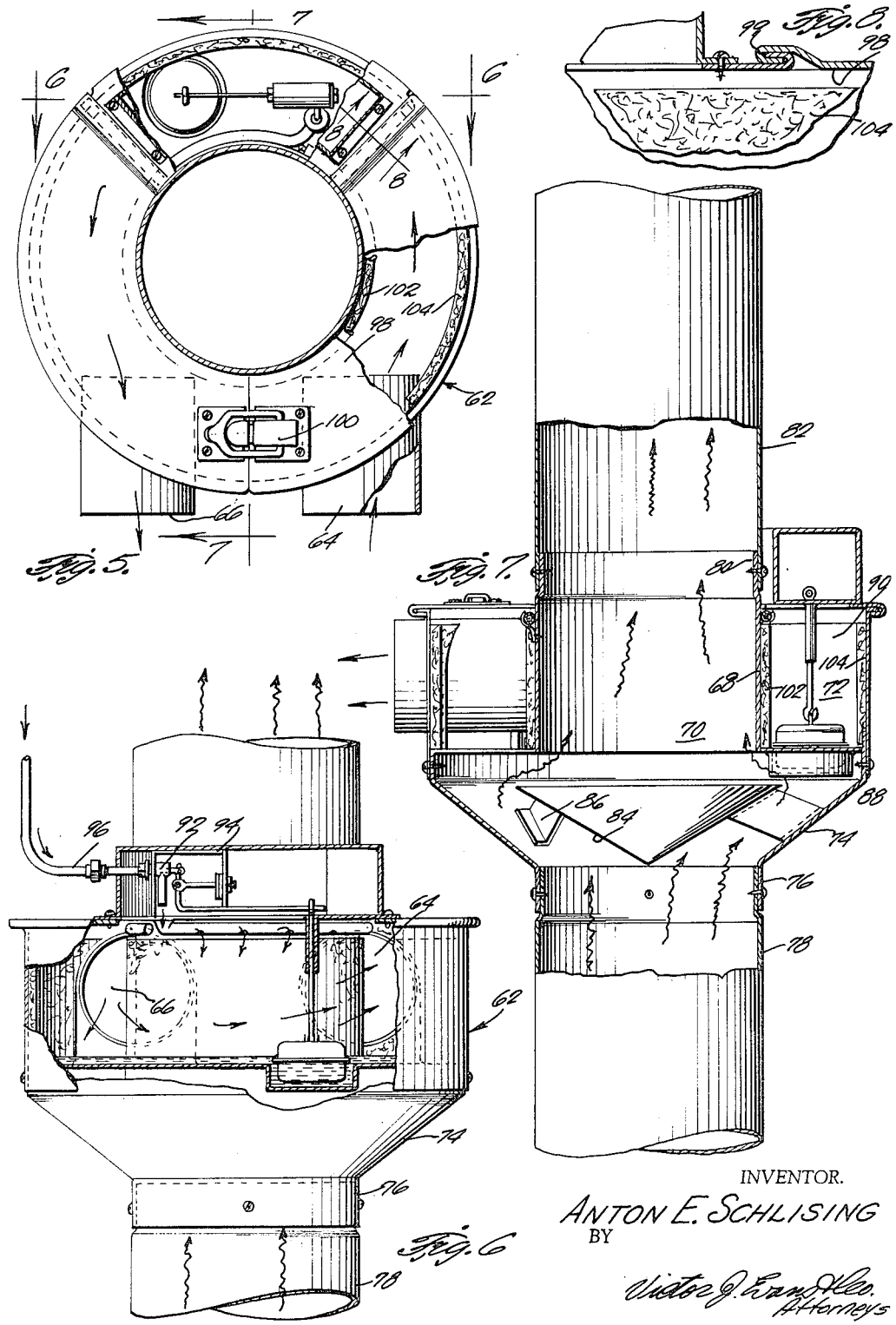

3,167,601
HUMIDIFIER
Anton E. Schlising, Rte. 1, Tomahawk, Wis.
Filed June 5, 1962, Ser. No. 200,263
2 Claims. (Cl. 261—154)

The present invention relates to furnaces generally and in particular to a humidifier for a warm air furnace.

An object of the present invention is to provide a device for utilizing the heat of combustion gases after leaving a furnace for evaporating water so as to add humid air to the air in a residence or other estalishment.

Another object of the present invention is to provide a humidifier which may be universally employed with all types of furnaces, particularly hot air furnaces, one which is efficient in operaiton, one requiring little or no attention over a long period of time, one which may be manufactured in quantity at reasonable cost, and one which is highly effective in action.

These and other objects and advantages of the present invention will be fully apparent from the following description when taken in connection with the annexed drawings, in which:

FIGURE 1 is a plan view with portions broken away showing the humidifier of the present invention, FIGURE 2 is a view taken on the line 2—2 of FIGURE 1, FIGURE 3 is a view taken on the line 3—3 of FIGURE 1, FIGURE 4 is a view on an enlarged scale, taken on the line 4—4 of FIGURE 1, FIGURE 5 is a plan view with portions broken away of a modified form of the invention, FIGURE 6 is a view taken on the line 6—6 of FIGURE 5, FIGURE 7 is a view taken on the line 7—7 of FIGURE 5, and FIGURE 8 is a view on an enlarged scale, taken on the line 8—8 of FIGURE 5.

With reference to the drawings in detail, in which like numerals indicate like parts throughout the several views, in FIGURES 1 to 4, inclusive, is shown a first embodiment of the present invention in which there is an upright housing 10 substantially U-shaped in configuration and having legs 12 and 14. An inner partition 16 sub-divides the housing 10 into an inner chamber 18 and an outer chamber 20.

The bottom end of the housing 10 is provided with a cone shaped ring 22 terminating in a vertically disposed skirt 24. Within the ring 22 is an inverted cone smoke deflector 26 supported on struts 28 which project inwardly from the ring 22. The deflector 26 faces the open lower end of the chamber 18. The housing is provided on its upper end with an extension 30 on the partition 16 for the insertion therein of a smoke pipe 32. The skirt 24 is adapted for insertion in the upper end of another smoke pipe 34.

Means is provided for supplying water to the outer chamber 20 for evaporation purposes. This means includes a tank 36 supported on a pipe coupling assembly 38 projecting outwardly of the housing 10 on one side of the latter and adjacent the leg 14. Within the tank 36 is a float element 40 mechanically connected by linkage 42 to a supply valve 44 having an inlet coupling 46 adapted for connection in communication with a source of water under pressure.

The legs 12 and 14 form openings for the egress and ingress of air into the chamber 20, respectively, as indicated by the arrows in FIGURE 1.

Within the chamber 20 is a vertically disposed partition 48 supported in clips 50 which are secured on the floor of the chamber 20. Also, lining the walls of the chamber 20 are wall elements 52 and 54. These are also supported by a flange 56 and by other clips 58, respectively.

The partition 48 and the walls 52 and 54 are fabricated of a porous material that draws water by capillary action upwardly out of the bottom of the chamber 20.

A removable cover 60 extends over the upper open end of the chamber 20.

In the form of the invention shown in FIGURES 5 to 8, inclusive, there is a housing 62 of more or less circular shape having an ingress opening 64 and an egress opening 66 in the wall of the housing 62. The housing 62 is provided with an inner partition 68 sub-dividing the housing 62 into an inner chamber 70 and an outer chamber 72. The inner chamber 70 is open at the top and open at the bottom.

A cone shaped ring 74 closes the lower end of the housing 62 and its smallest end is provided with a vertically disposed skirt 76 of a size to receive therein the upper end portion of a stove pipe 78. The partition 68 has an extension 80 on its upper end adapted for insertion in the lower end portion of another stove pipe 82. Projecting upwardly and facing the lower end of the chamber 70 is a smoke deflector 84 supported on struts 86 which project inwardly from the ring 74. One portion of the outer chamber 72 is provided with means for introducing water into the outer chamber 72. This means consists in a float element 88 connected by linkage 90 to an inlet valve 92 disposed in a casing 94 and adjacent portion of the housing 62. The valve 92 is connected by a conduit 96 to a source of water under pressure.

A cover 98 formed in three pieces closes the upper end of the outer chamber 72 and is secured together by means of interlocking ends 99, shown in FIGURE 8, and a latch member 100 for securing adjacent ends of the cover sections together.

In this form of the invention the walls 102 and 104 of the chamber 72 are formed of a material which by capillary action attracts water from one end to the other end.

In each of the forms of the invention the outer chamber is adapted for connection to the duct work of a hot air furnace in order that moisture may be added to the air of the residence or other establishment in which the furnace is located. Air is admitted under pressure into the ingress opening of each of the outer chambers and is taken from the egress opening for transfer to the rooms of the building where the device is employed.

Water is admitted automatically through the float control valve 44 or 92 and the level of water within the outer chamber is maintained at a predetermined level by such valve means. It will be found that the air in the residence will be more healthful due to the moisture content of the air supplied by the device of the present invention in either of its embodiments.

Preferably the device of the present invention in either of its embodiments is formed of sheet metal fabricated on conventional machines and the walls of the outer chamber are fabricated of suitable mesh material or ceramic material of conventional structure for the capillary action of the water.

While only preferred embodiments of the present invention are shown and described other embodiments are contemplated and numerous changes and modifications may be made therein without departing from the spirit of the invention as set forth in the appended claims.

What is claimed is:

1. A humidifier for hot air furnaces comprising an upright housing having an inner partition wall defining an inner chamber open at the top and bottom, said housing having an outer wall spaced from the inner wall and defining a generally U-shaped, horizontally disposed chamber partially surrounding said inner chamber, upstanding wall means lining said inner and outer walls and constructed of porous material and drawing water by capillary action, said housing having a flat bottom wall, a conduit element connected to the bottom wall of said housing, said conduit element being adapted to be connected to a smoke pipe for the passage of hot flue gases therethrough, a cone-shaped smoke deflector, means positioning said cone-shaped deflector in said conduit element for directing the passage of said hot flue gases onto the flat bottom wall of said housing, an ingress opening and an egress opening in the outer wall of said housing for passage of air, float means, valve means connected to said float means for admitting water to said outer chamber and passing along said upstanding wall means of porous material by said capillary action to humidify the air as passed thereover from said ingress opening.

2. The humidifier of claim 1 wherein there are means on said housing adapted to connect the open upper end of said inner chamber to said smoke pipe.

References Cited by the Examiner

UNITED STATES PATENTS

| | | | |
|---|---|---|---|
| 472,060 | 4/92 | Libbey | 126—313 |
| 640,475 | 1/00 | Lanphear | 122—32 |
| 1,163,402 | 12/15 | Gillin | 261—154 |
| 2,022,394 | 11/35 | Weyl | 261—104 |
| 2,085,390 | 6/37 | Quinlivan | 261—104 |
| 2,838,294 | 6/58 | Skerritt | 261—104 |

FOREIGN PATENTS

| | | |
|---|---|---|
| 12,620 | 5/01 | Great Britain. |
| 230,845 | 12/25 | Great Britain. |

HARRY B. THORNTON, *Primary Examiner.*

RONALD R. WEAVER, *Examiner.*